(12) United States Patent
Chen et al.

(10) Patent No.: US 10,816,633 B2
(45) Date of Patent: Oct. 27, 2020

(54) DEVICE CONTROL METHOD, APPARATUS AND SYSTEM (71) Applicant: HANGZHOU HIKVISION DIGITAL TECHNOLOGY CO., LTD., Hangzhou (CN)

(72) Inventors: Yangkun Chen, Hangzhou (CN); Saijuan He, Hangzhou (CN); Zhan Chen, Hangzhou (CN)

(73) Assignee: HANGZHOU HIKVISION DIGITAL TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 16/462,453

(22) PCT Filed: Oct. 19, 2017

(86) PCT No.: PCT/CN2017/106800
§ 371 (c)(1),
(2) Date: May 20, 2019

(87) PCT Pub. No.: WO2018/095166
PCT Pub. Date: May 31, 2018

(65) Prior Publication Data
US 2019/0317178 A1    Oct. 17, 2019

(30) Foreign Application Priority Data
Nov. 23, 2016    (CN) .......................... 2016 1 1047345

(51) Int. Cl.
H04N 5/232    (2006.01)
H04N 5/44    (2011.01)
(Continued)

(52) U.S. Cl.
CPC ....... G01S 3/7864 (2013.01); H04N 5/23216 (2013.01); H04N 5/23299 (2018.08);
(Continued)

(58) Field of Classification Search
CPC .................. G01S 3/7864; H04N 5/232127
See application file for complete search history.

(56) References Cited

U.S. PATENT DOCUMENTS

| 6,707,489 B1 | 3/2004 | Maeng et al. |
| 7,012,630 B2 * | 3/2006 | Curry ..................... H04M 3/56 348/14.08 |

(Continued)

FOREIGN PATENT DOCUMENTS

| CN | 205490942 | 8/1916 |
| CN | 101534413 | 9/2009 |

(Continued)

OTHER PUBLICATIONS

Office Action issued in Corresponding Chinese Patent Application No. 201611047345.8, dated Jul. 29, 2019 (English machine translation).

(Continued)

Primary Examiner — Irfan Habib
(74) Attorney, Agent, or Firm — Norton Rose Fulbright US LLP (57) ABSTRACT Disclosed is a method, apparatus and system for controlling a device applicable to a video capture device (610) in a sound source localization system. A method can include: acquiring a voice signal captured by each of the microphones (620), and acquiring coordinate information of each of the microphones (620) and coordinate information of each of preset positions (S101), calculating a voice power value corresponding to each of the preset positions based on the voice signal captured by each of the microphones (620), the coordinate information of each of the microphones (620) and the coordinate information of each of the preset positions (S102), identifying a preset position with a maximum voice power value, determining the preset position as a (Continued)

position of the sound source, and controlling the video capture device to direct at the position of the sound source (S103).

15 Claims, 4 Drawing Sheets (51) Int. Cl.
H04N 7/15 (2006.01)
G01S 3/786 (2006.01)
H04R 1/40 (2006.01)

(52) U.S. Cl.
CPC ..... *H04N 5/232127* (2018.08); *H04N 5/4403* (2013.01); *H04N 7/15* (2013.01); *H04R 1/406* (2013.01); *H04N 2005/4432* (2013.01)

(56) References Cited

U.S. PATENT DOCUMENTS

| | | | | |
|---|---|---|---|---|
| 7,421,113 | B2* | 9/2008 | Taylor | G06K 9/209 |
| | | | | 345/419 |
| 7,667,728 | B2* | 2/2010 | Kenoyer | H04N 7/14 |
| | | | | 348/14.08 |
| 8,391,472 | B2* | 3/2013 | Ghani | H04M 9/08 |
| | | | | 379/406.08 |
| 8,508,576 | B2* | 8/2013 | Liu | H04N 7/15 |
| | | | | 348/14.08 |
| 8,666,047 | B2* | 3/2014 | Rambo | H04M 9/10 |
| | | | | 348/14.08 |
| 8,693,713 | B2* | 4/2014 | Chen | H04R 27/00 |
| | | | | 348/14.08 |
| 9,197,974 | B1* | 11/2015 | Clark | H04M 9/08 |
| 9,380,309 | B2* | 6/2016 | Huang | H04N 19/176 |
| 9,449,233 | B2* | 9/2016 | Taylor | G06T 7/292 |
| 9,584,758 | B1* | 2/2017 | Chen | H04W 12/003 |
| 9,621,795 | B1* | 4/2017 | Whyte | H04N 5/23219 |
| 9,654,868 | B2* | 5/2017 | Benattar | H04R 1/406 |
| 9,659,576 | B1* | 5/2017 | Kotvis | G10L 21/0224 |
| 9,866,952 | B2* | 1/2018 | Pandey | H04R 3/005 |
| 9,966,059 | B1* | 5/2018 | Ayrapetian | G10K 11/346 |
| 9,992,580 | B2* | 6/2018 | Cohen | H04N 7/147 |
| 10,015,529 | B2* | 7/2018 | Guo | H04N 7/181 |
| 10,110,994 | B1* | 10/2018 | Davis | H04R 1/406 |
| 10,142,649 | B2* | 11/2018 | Jeong | H04N 19/55 |
| 10,575,096 | B2* | 2/2020 | Wang | G01S 11/14 |
| 10,638,142 | B2* | 4/2020 | Guo | H04N 19/463 |
| 2008/0267423 | A1* | 10/2008 | Hiekata | H04R 3/005 |
| | | | | 381/92 |
| 2011/0051940 | A1* | 3/2011 | Ishikawa | H04L 12/40013 |
| | | | | 381/22 |
| 2012/0033030 | A1* | 2/2012 | Liu | H04N 7/15 |
| | | | | 348/14.08 |
| 2012/0155703 | A1* | 6/2012 | Hernandez-Abrego | |
| | | | | H04R 3/005 |
| | | | | 382/103 |
| 2012/0288113 | A1* | 11/2012 | Akino | H04R 1/406 |
| | | | | 381/92 |
| 2014/0219472 | A1* | 8/2014 | Huang | H04R 5/027 |
| | | | | 381/92 |
| 2014/0278383 | A1* | 9/2014 | Fan | H03G 3/00 |
| | | | | 704/224 |
| 2015/0350769 | A1* | 12/2015 | Sun | H04N 7/142 |
| | | | | 348/14.08 |
| 2016/0100156 | A1* | 4/2016 | Zhou | H04N 13/243 |
| | | | | 13/243 |
| 2016/0142620 | A1 | 5/2016 | Sawa et al. | |
| 2017/0257709 | A1* | 9/2017 | Cohen | H04N 7/15 |
| 2017/0324931 | A1* | 11/2017 | Sun | H04N 7/15 |
| 2017/0345437 | A1* | 11/2017 | Zhang | G10L 21/10 |
| 2017/0374317 | A1* | 12/2017 | Sun | H04N 7/147 |

FOREIGN PATENT DOCUMENTS

| | | |
|---|---|---|
| CN | 103235287 | 8/2013 |
| CN | 103841357 | 6/2014 |
| CN | 104142492 | 11/2014 |
| CN | 104898091 | 9/2015 |
| EP | 2953348 | 12/2015 |
| JP | 2003322790 A | 11/2003 |

OTHER PUBLICATIONS

Extended European Search Report issued in Corresponding European Patent Application No. 17874320.9, dated Sep. 6, 2019 (9 pages).

Wan, et al. "improved steered response power method for sound source localization based on principal eigenvector", Applied Acoustics, Elsevier Publishing, GB, vol. 71, No. 12, Dec. 1, 2010, pp. 1126-1131.

International Search Report and Written Opinion issued in Corresponding International Patent Application No. PCT/CN2017/106800, dated Jan. 17, 2018.

\* cited by examiner

DEVICE CONTROL METHOD, APPARATUS AND SYSTEM

CROSS-REFERENCE TO RELATED APPLICATIONS

The present application is a national phase under 35 U.S.C. § 371 of International Application No. PCT/CN2017/106800, filed Oct. 19, 2017, which claims priority to Chinese Patent Application No. 201611047345.8, filed with the China National Intellectual Property Administration on Nov. 23, 2016 and entitled "device control method, apparatus and system", each of which are incorporated into the present application by reference in their entirety.

TECHNICAL FIELD

The present application relates to the field of automatic control technology, and in particular, to a method, apparatus and system for controlling a device.

BACKGROUND

With the development of communication technology, information interaction has become more and more convenient. For example, in the field of offices, users at different regions may perform videoconferencing; or, in the field of education, online teaching may be performed by means of living broadcast, or teaching may be performed by means of recording and broadcasting a video.

During the videoconferencing, the online teaching or recording and broadcasting a video, it is often necessary to locate a person who is speaking and control a video capture device to direct at the person who is speaking. Specifically, the video capture device may be installed in a conference room or a classroom. For example, the video capture device may be a pan-tilt camera capable of 360-degree rotation and up-and-down adjustment. The video capture device locates a position of the sound source, that is, the position of the person who is speaking, and the video capture device is further controlled to direct at the person who is speaking.

The known method for controlling a device mainly includes: installing a microphone on a video capture device, locating the position of the sound source, that is, the position of the person who is speaking by detecting the sound received by the microphone, and then controlling the video capture device to direct at the position of the sound source. However, in the above method, since the microphone is installed on the video capture device, it is usually only possible to locate a sound source that is close to the video capture device, which cannot accurately locate a sound source that is far away from the video capture device. Therefore, in the above method, the accuracy of the sound source localization is low, resulting in the low accuracy of the device control.

SUMMARY

The objective of embodiments of the present application is to provide a method, apparatus and system for controlling a device, so as to improve the accuracy of the device control. The following specific technical solutions are provided.

In a first aspect, an embodiment of the present application provides a method for controlling a device, which is applicable to a video capture device in a sound source localization system; wherein, the sound source localization system further includes microphones disposed outside the video capture device, and the method includes:

acquiring a voice signal captured by each of the microphones, and acquiring coordinate information of each of the microphones and coordinate information of each of preset positions;

calculating a voice power value corresponding to each of the preset positions based on the voice signal captured by each of the microphones, the coordinate information of each of the microphones and the coordinate information of each of the preset positions;

identifying a preset position with a maximum voice power value, determining the preset position as a position of a sound source, and controlling the video capture device to direct at the position of the sound source.

Optionally, calculating a voice power value corresponding to each of the preset positions based on the voice signal captured by each of the microphones, the coordinate information of each of the microphones and the coordinate information of each of the preset positions, includes:

calculating a Fourier transform of each voice signal captured by each of the microphones;

for each of the preset positions:

calculating a difference of delay between the preset position and every two adjacent microphones based on the coordinate information of the preset position and the coordinate information of each of the microphones;

calculating, based on the Fourier transform of each voice signal and the difference of delay between the preset position and every two adjacent microphones, a generalized cross-correlation of the preset position with every two adjacent microphones;

calculating, based on the generalized cross-correlation of the preset position with every two adjacent microphones, the voice power value corresponding to the preset position.

Optionally, for each of the preset positions, calculating a difference of delay between the preset position and every two adjacent microphones based on the coordinate information of the preset position and the coordinate information of each of the microphones, includes:

calculating a difference of delay $\tau_{mkl}$ between any preset position m and any two adjacent microphones k, l according to the following formula:

$$\tau_{mkl} = \frac{|D_{mk} - D_{ml}|}{c}$$

wherein, $D_{mk}$ is a distance from the preset position m to the microphone k, $D_{ml}$ is the a distance from the preset position m to the microphone l, and c is the sound speed.

Optionally, calculating, based on the Fourier transform of each voice signal and the difference of delay between the preset position and every two adjacent microphones, a generalized cross-correlation of the preset position with every two adjacent microphones, includes:

calculating a generalized cross-correlation $R(\tau_{mkl})$ of any preset position m with any two adjacent microphones k, l, according to the following formula:

$$R(\tau_{mkl}) = \int_{-\infty}^{+\infty} \phi_{kl}(w) M_k(w) M^*_l(w) e^{jw\tau} dw$$

wherein, $M_k(w)$ is a Fourier transform of a voice signal received by the microphone k; $M^*_l(w)$ is a conjugate of a Fourier transform of a voice signal received by the microphone l; w is a frequency of a voice signal; $\phi_{kl}(w)$ is determined by the following formula:

$$\phi_{kl}(w) = \frac{1}{|M_k(w)M_l^*(w)|}.$$

Optionally, calculating, based on the generalized cross-correlation of the preset position with every two adjacent microphones, the voice power value corresponding to the preset position, includes:

calculating a voice power value P(m) corresponding to any preset position m according to the following formula:

$$P(m) = \sum_{k=1}^{M} \sum_{l=k+1}^{M} R(\tau_{mkl})$$

wherein, M is the total number of the microphones.

Optionally, the method further includes:

determining a height of a person at the position of the sound source;

calculating, based on coordinate information of the video capture device, height of the video capture device, coordinate information of the position of the sound source and the height of the person at the position of the sound source, a target distance from the video capture device to the person;

identifying, based on a pre-stored correspondence between distances and focal lengths, a target focal length corresponding to the target distance, and adjusting a focal length of the video capture device to the target focal length.

Optionally, determining a height of a person at the position of the sound source, includes:

acquiring a pre-stored average height of people, and determining the acquired average height of people as the height of the person at the position of the sound source; or capturing an image including the person at the position of the sound source, and analyzing the image to obtain the height of the person at the position of the sound source.

In a second aspect, an embodiment of the present application provides an apparatus for controlling a device, which is applicable to a video capture device in a sound source localization system; wherein, the sound source localization system further includes microphones disposed outside the video capture device, and the apparatus includes:

an acquisition module, configured for acquiring a voice signal captured by each of the microphones, and acquiring coordinate information of each of the microphones and coordinate information of each of preset positions;

a first calculation module, configured for calculating a voice power value corresponding to each of the preset positions based on the voice signal captured by each of the microphones, the coordinate information of each of the microphones and the coordinate information of each of the preset positions;

a control module, configured for identifying a preset position with a maximum voice power value, determining the preset position as a position of a sound source, and controlling the video capture device to direct at the position of the sound source.

Optionally, the calculation module includes:

a first calculation submodule, configured for calculating a Fourier transform of each voice signal captured by each of the microphones;

a second calculation submodule, configured for, for each of the preset positions, calculating a difference of delay between the preset position and every two adjacent microphones based on the coordinate information of the preset position and the coordinate information of each of the microphones;

a third calculation submodule, configured for, for each of the preset positions, calculating a generalized cross-correlation of the preset position with every two adjacent microphones based on the Fourier transform of each voice signal and the difference of delay between the preset position and every two adjacent microphones;

a fourth calculation submodule, configured for, for each of the preset positions, calculating the voice power value corresponding to the preset position based on the generalized cross-correlation of the preset position with every two adjacent microphones.

Optionally, the second calculation submodule is specifically configured for calculating a difference of delay $\tau_{mkl}$ between any preset position m and any two adjacent microphones k, l, according to the following formula:

$$\tau_{mkl} = \frac{|D_{mk} - D_{ml}|}{c}$$

wherein, $D_{mk}$ is a distance from the preset position m to the microphone k, $D_{ml}$ is the a distance from the preset position m to the microphone l, and c is the sound speed.

Optionally, the third calculation submodule is specifically configured for calculating a generalized cross-correlation $R(\tau_{mkl})$ of any preset position m with any two adjacent microphones k, l according to the following formula:

$$R(\tau_{mkl}) = \int_{-\infty}^{+\infty} \phi_{kl}(w) M_k(w) M^*_l(w) e^{jw\tau} dw$$

wherein, $M_k(w)$ is a Fourier transform of a voice signal received by the microphone k; $M^*_l(w)$ is a conjugate of a Fourier transform of a voice signal received by the microphone l; w is a frequency of a voice signal; $\phi_{kl}(w)$ is determined by the following formula:

$$\phi_{kl}(w) = \frac{1}{|M_k(w)M_l^*(w)|}.$$

Optionally, the fourth calculation submodule is specifically configured for calculating a voice power value P(m) corresponding to any preset position m according to the following formula:

$$P(m) = \sum_{k=1}^{M} \sum_{l=k+1}^{M} R(\tau_{mkl})$$

wherein, M is the total number of the microphones.

Optionally, the apparatus further includes:

a determination module, configured for determining a height of a person at the position of the sound source;

a second calculation module, configured for calculating, based on coordinate information of the video capture device, height of the video capture device, coordinate information of the position of the sound source and the height of the person at the position of the sound source, a target distance from the video capture device to the person;

an adjustment module, configured for identifying, based on a pre-stored correspondence between distances and focal lengths, a target focal length corresponding to the target distance, and adjusting a focal length of the video capture device to the target focal length.

Optionally, the determining module is specifically configured for:

acquiring a pre-stored average height of people, and determining the acquired average height of people as the height of the person at the position of the sound source; or capturing an image including the person at the position of the sound source, and analyzing the image to obtain the height of the person at the position of the sound source.

In a third aspect, an embodiment of the present application further provides a system for controlling a device. The system includes a video capture device and microphones disposed outside the video capture device.

The video capture device is configured for acquiring a voice signal captured by each of the microphones, and acquiring coordinate information of each of the microphones and coordinate information of each of preset positions, calculating a voice power value corresponding to each of the preset positions based on the voice signal captured by each of the microphones, the coordinate information of each of the microphones and the coordinate information of each of the preset positions, identifying a preset position with a maximum voice power value, determining the preset position as a position of a sound source, and controlling the video capture device to direct at the position of the sound source.

Each of the microphones is configured for capturing a voice signal, and sending the captured voice signal to the video capture device.

In a fourth aspect, an embodiment of the present application further provides a video capture device, including:

a processor, a memory, a communication interface and a bus.

The processor, the memory, and the communication interface are connected and communicate with each other via the bus.

The memory stores executable program code.

The processor executes a program corresponding to the executable program code by reading the executable program code stored in the memory, to implement, when executing the program, the method for controlling a device according to the first aspect of the present application.

In a fifth aspect, the present application provides a storage medium; wherein, the storage medium is configured for storing executable program code, and the executable program code are configured for, when executed, implementing the method for controlling a device according to the first aspect of the present application.

In a sixth aspect, the present application provides an application program; wherein, the application program is configured for, when executed, implementing the method for controlling a device according to the first aspect of the present application.

In the embodiment of the present application, the video capture device may acquire a voice signal captured by each of the microphones, acquire coordinate information of each of the microphones and coordinate information of each of preset positions, then, calculate a voice power value corresponding to each of the preset positions based on the voice signal captured by each of the microphones, the coordinate information of each of the microphones and the coordinate information of each of the preset positions, finally, identify a preset position with the maximum voice power value, determine the preset position as a position of the sound source, and control itself to direct at the position of the sound source. In the embodiment of the present application, microphones are disposed outside the video capture device, and the sound in the scene to be captured can all be captured by the microphones. Therefore, the accuracy of the sound source localization can be improved, thereby improving the accuracy of the device control.

BRIEF DESCRIPTION OF THE DRAWINGS

In order to more clearly describe the technical solutions the embodiments of the present application and the prior art, accompanying drawings that need to be used in embodiments and the prior art will be briefly described below. Obviously, accompanying drawings described below are for only some of embodiments of the present application; those skilled in the art may also obtain other accompanying drawings based on these accompanying drawings without any creative efforts.

DETAILED DESCRIPTION

In order to improve the accuracy of locating a sound source and thus improve the accuracy of controlling a device, embodiments of the present application provide a method, apparatus and system for controlling a device.

The technical solutions in the embodiments of the present application will be described clearly and completely below in combination with the accompanying drawings of the present application. Obviously, the embodiments described are merely a part of and not all of the embodiments of the present application. All other embodiments obtained by those skilled in the art based on the embodiments of the present application without creative efforts shall fall within the scope of protection of the present application.

It should be noted that, the features of the embodiments and embodiments in the present application may be combined with each other, without conflict. The present application will be described in detail with reference to the accompanying drawings and in combination with the embodiments.

Figure 1:
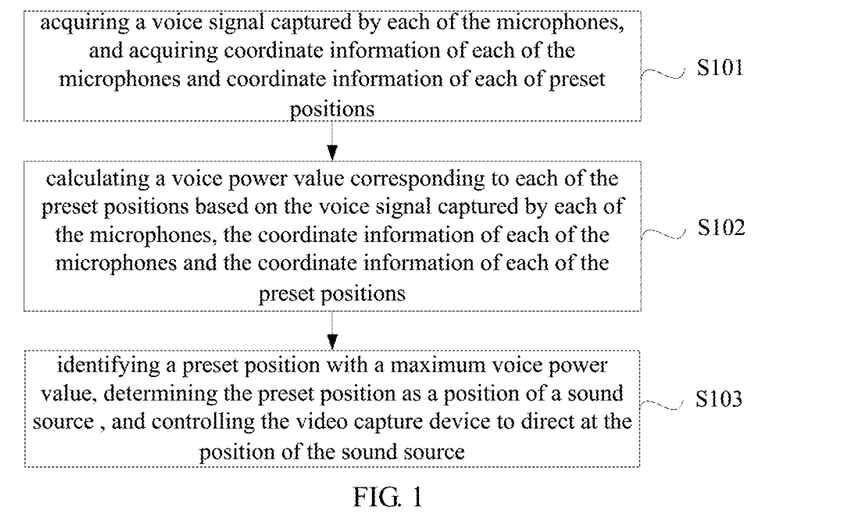
FIG. 1 is a flowchart of a method for controlling a device according to an embodiment of the present application.

An embodiment of the present application provides a method for controlling a device. As shown in FIG. 1, the method may include the following steps.

At step S101, a voice signal captured by each of the microphones, coordinate information of each of the microphones and coordinate information of each of preset positions are acquired.

In the embodiment of the present application, in order to improve the accuracy of locating a sound source, a video capture device may be installed in a scene, such as a classroom or a conference room, where the sound source localization is required, and microphones are installed outside the video capture device. The video capture device may be a ballhead camera, a camera, or the like, which is not limited in this embodiment of the present application.

Figure 2A:
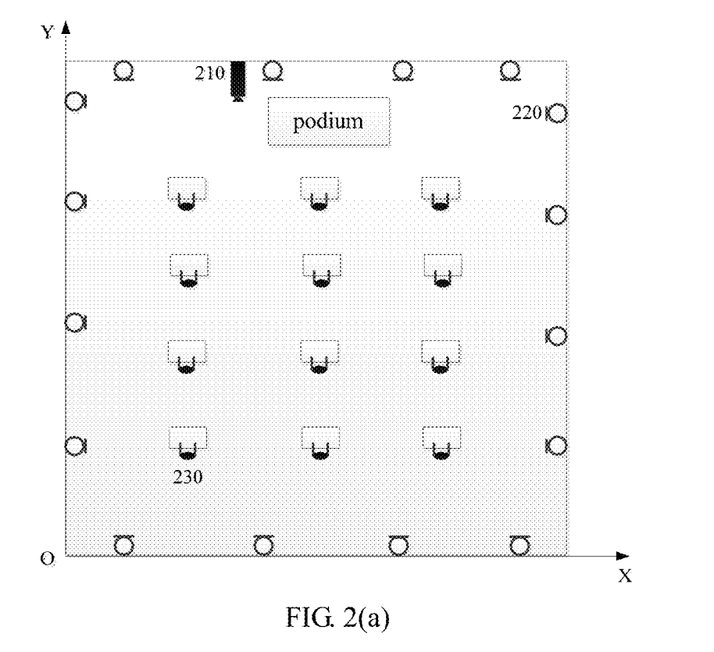
FIG. 2(a) is a schematic diagram showing the distribution of microphones in a classroom according to an embodiment of the present application.

Specifically, a plurality of microphones may be installed, and in order to well receive a voice signal from each of areas of the scene to be captured, such as a classroom, a conference room, the plurality of microphones may be installed in each of the areas of the scene. For example, FIG. 2(a) shows a schematic diagram of a distribution of microphones in a classroom according to the embodiment of the present application, which is a top view of the classroom. As shown in FIG. 2(a), the video capture device 210 may be installed near a podium, and the plurality of microphones may be installed on the walls around the classroom. Moreover, microphones installed on each wall may be arranged at equal interval, or may be arranged at different intervals based on the distribution of the students 230 in the classroom.

Figure 2B:
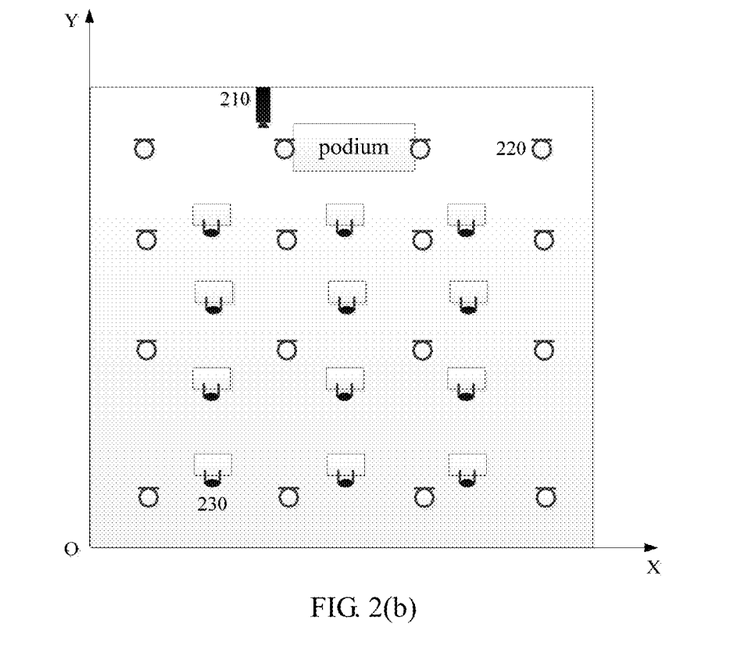
FIG. 2(b) is another schematic diagram showing the distribution of microphones in a classroom according to an embodiment of the present application.

Alternatively, FIG. 2(b) shows another schematic diagram of a distribution of microphones in a classroom according to the embodiment of the present application, which is a top view of the classroom. As shown in FIG. 2(b), the video capture device 210 may be installed near the podium, and the plurality of microphones may be installed on the roof of the classroom. Moreover, the microphones on the roof may be arranged at equal interval, or may be arranged at different intervals based on the distribution of the students 230 in the classroom.

Moreover, identification information of each of microphones and identification information of each of preset positions may also be determined. For example, the identification information of each microphone may be a, b, l, k, etc., and the identification information of each preset position may be 1, 2, 3, etc. It is also possible to construct a plane coordinate system in the scene to be captured, and determine coordinate information of each microphone and coordinate information of each preset position based on the constructed plane coordinate system. Each of the above preset positions is a position at which a person who is speaking may appear.

For example, as shown in FIGS. 2(a) and 2(b), the direction of an intersecting line between a certain wall of the classroom and the ground may be determined as an X-axis, and the direction of an intersecting line between another wall adjacent to the above wall and the ground may be determined as a Y-axis, the point where the X-axis intersects with the Y-axis is point O. After determining the X-axis and the Y-axis, the coordinate information of each of microphones may be determined. For example, the coordinate information of a microphone n may be (Xn, Yn). Moreover, the coordinate information of each of microphones may be stored in the video capture device. The coordinate information of each of microphones stored in the video capture device may be as shown in Table 1.

TABLE 1

| identification information of microphones | coordinate information |
|---|---|
| n | (1.0, 0.2) |
| k | (3.0, 0.2) |
| l | (5.0, 0.2) |
| t | (7.0, 0.2) |

In the classroom, the person who is speaking may be a teacher or a student. The teacher is usually on the podium, and the student is usually in his or her seat. That is to say, positions at which the person who is speaking may appear are the podium or the seat of each of students. Therefore, after determining the X-axis and the Y-axis, coordinate information of the podium and coordinate information of the seat of each of students may also be determined. For example, the coordinate information of the i-th preset position may be determined as (Xi, Yi). Moreover, the coordinate information of the podium and the coordinate information of seats of all of students may be stored in the video capture device as coordinate information of all of preset positions. The coordinate information of each of the preset positions stored in the video capture device may be as shown in Table 2.

TABLE 2

| identification information of preset positions | coordinate information |
|---|---|
| 1 | (4.0, 7.8) |
| 2 | (2.0, 6.2) |
| 3 | (4.0, 6.2) |
| 4 | (6.0, 6.2) |

In the embodiment of the present application, voice signals captured by microphones may be transmitted to the video capture device via an analog circuit. Therefore, in the embodiment of the present application, the video capture device may acquire the voice signals captured by all microphones. Moreover, in order to perform sound source localization, the video capture device may also acquire coordinate information of each of the microphones and coordinate information of each of the preset positions. For example, the video capture device may acquire the coordinate information of each of the microphones and the coordinate information of each of the preset positions from a local predetermined storage space.

At step S102, a voice power value corresponding to each of the preset positions is calculated based on the voice signal captured by each of the microphones, the coordinate information of each of the microphones and the coordinate information of each of the preset positions.

In the embodiment of the present application, after acquiring the voice signal captured by each of microphones, the coordinate information of each of the microphones and the coordinate information of each of the preset positions, the video capture device may calculate a voice power value corresponding to each of the preset positions based on the voice signal captured by each of the microphones, the coordinate information of each of the microphones and the coordinate information of each of the preset positions, to determine a position where the sound source is located.

The voice power value corresponding to each preset position may be configured for representing the volume of the sound at the preset position. It can be understood that a preset position corresponding to the maximum voice power value is a position where the volume of the sound is maximum, i.e. the position of the sound source. Specifically, the video capture device may calculate a voice power value corresponding to each of preset positions respectively.

For example, the video capture device may calculate Fourier transform of each voice signal captured by each microphone. Specifically, the video capture device may calculate the Fourier transform of each of the voice signals based on an existing manner, which will be not described in detail herein.

For any one of the preset positions, the video capture device may firstly, based on the coordinate information of this preset position and the coordinate information of each of the microphones, calculate a difference of delay between the preset position and every two adjacent microphones. Specifically, the difference of delay $\tau_{mkl}$ between any preset position m and any two adjacent microphones k, l may be calculated according to the following formula:

$$\tau_{mkl} = \frac{|D_{mk} - D_{ml}|}{c}$$

wherein, $D_{mk}$ is a distance from the preset position m to a microphone k, $D_{ml}$ is a distance from the preset position m to a microphone l, and c is the sound speed, c=340 m/s.

When the coordinate information of the preset position m is (Xm, Ym), the coordinate information of the microphone k is (Xk, Yk), and the coordinate information of the microphone l is (Xl, Yl), $D_{mk}$ and $D_{ml}$ respectively are:

$$D_{mk} = \sqrt{(Xm-Xk)^2 + (Ym-Yk)^2}$$
$$D_{ml} = \sqrt{(Xm-Xl)^2 + (Ym-Yl)^2}$$

Then, the video capture device may calculate a generalized cross-correlation of the preset position with every two adjacent microphones, based on the Fourier transform of each of the voice signals and the difference of delay between the preset position and every two adjacent microphones.

Specifically, the video capture device may calculate a generalized cross-correlation $R(\tau_{mkl})$ between the preset position m and adjacent microphones k, l according to the following formula:

$$R(\tau_{mkl}) = \int_{-\infty}^{+\infty} \phi_{kl}(w) M_k(w) M^*_l(w) e^{jw\tau} dw$$

wherein, $M_k(w)$ is a Fourier transform of a voice signal received by the microphone k; $M^*_l(w)$ is a conjugate of a Fourier transform of a voice signal received by the microphone l; w is a frequency of a voice signal; $\phi_{kl}(w)$ is determined by the following formula:

$$\phi_{kl}(w) = \frac{1}{|M_k(w) M^*_l(w)|}$$

Finally, the video capture device may calculate the voice power value corresponding to the preset position, based on the generalized cross-correlation of the preset position with every two adjacent microphones. Specifically, the video capture device may calculate a voice power value P(m) corresponding to the preset position m according to the following formula:

$$P(m) = \sum_{k=1}^{M} \sum_{l=k+1}^{M} R(\tau_{mkl})$$

wherein, M is the total number of the microphones.

At step S103, a preset position with a maximum voice power value is identified, the preset position is determined as a position of the sound source, and the video capture device is controlled to direct at the position of the sound source.

After the video capture device calculates a voice power value corresponding to each preset position, the video capture device may identify the preset position with a maximum voice power value, and determine the preset position as a position of the sound source.

The position of the sound source is a position where the person who is speaking is located. Compared with other positions, sound at this position should be the highest, and thus the voice power value corresponding to this position should be the maximum. Therefore, in the embodiment of the present application, a position with the maximum voice power value may be determined as the position of the sound source.

After determining the position of the sound source, the video capture device may control itself to direct at the position of the sound source for video recording the person who is speaking. For example, the video capture device may control the orientation of its lens to direct at the position of the sound source. The process of the video capture device controlling the orientation of its lens to direct at the position of the sound source may be any one of existing methods, which will not be described in detail herein.

The embodiment of the present application provides a method for controlling a device. The video capture device may acquire a voice signal captured by each of the microphones, acquire coordinate information of each of the microphones and coordinate information of each of preset positions, then, calculate a voice power value corresponding to each of the preset positions based on the voice signal captured by each of the microphones, the coordinate information of each of the microphones and the coordinate information of each of the preset positions, finally, identify a preset position with the maximum voice power value, determine the preset position as a position of the sound source, and control itself to direct at the position of the sound source. In the embodiment of the present application, microphones are disposed outside the video capture device, and the sound in the scene to be captured can all be captured by the microphones. Therefore, the accuracy of the sound source localization can be improved, thereby improving the accuracy of the device control.

In the video recording process, the video capture device usually needs to adjust a focal length for target objects at different distances to achieve a better recording effect. For example, when recording a target object that is close to the video capture device, a smaller focal length may be used to record the entire target object. When recording a target object that is far away from the video capture device, a larger focal length may be used to enlarge the target object, to ensure the definition of the target object in the recorded image.

Figure 3:
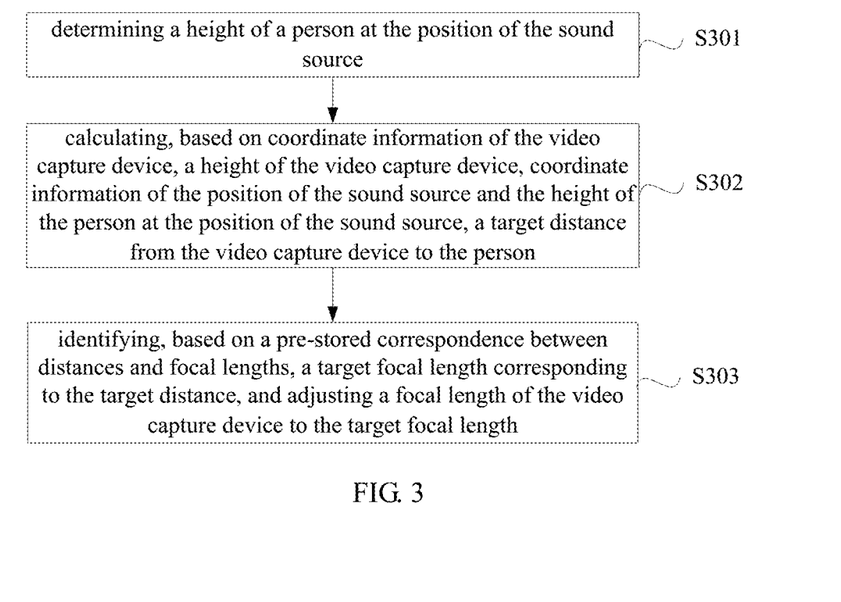
FIG. 3 is another flowchart of a method for controlling a device according to an embodiment of the present application.

As an implementation of the embodiment of the present application, after the video capture device controls itself to direct at the position of the sound source, for different position of the sound sources, the video capture device may also adjust the focal length thereof to achieve a better recording effect. As shown in FIG. 3, the method for controlling a device provided by the embodiment of the present application, may further include following steps.

At step S301, height of a person at the position of the sound source is determined.

In the embodiment of the present application, the video capture device can only determine the two-dimensional coordinates of the position of the sound source. In order to accurately determine the precise distance between the video capture device and the person at the position of the sound source, the video capture device, after controlling itself to direct at the position of the sound source, may further determine the height of the person at the position of the sound source.

In one implementation, the video capture device may pre-store the average height of people, such as 1.68 meters, 1.70 meters, 1.72 meters, and the like. When determining the height of the person at the position of the sound source, pre-stored average height of people is acquired, and the acquired average height is determined as the height of the person at the position of the sound source.

In another implementation, in order to improve the accuracy of determining the height of the person, the video capture device may capture an image including the person at the position of the sound source, and analyze the image to obtain the height of the person at the position of the sound source. The process of the video capture device capturing the image and the process of the video capture device analyzing the image may be performed by any one of existing methods, which will be not described in detail herein.

At step S302, a target distance from the video capture device to the person is calculated, based on the coordinate information of the video capture device, height of the video capture device, coordinate information of the position of the sound source and the height of the person at the position of the sound source.

After determining the height of the person at the position of the sound source, the video capture device may further calculate the target distance from itself to the person, based on its coordinate information and height, the coordinate information of the position of the sound source and the height of the person at the position of the sound source.

Specifically, the video capture device may determine its three-dimensional coordinate based on its coordinate information and height, determine three-dimensional coordinate of the person based on the coordinate information of the position of the sound source and the height of the person at the position of the sound source, and then determine the target distance from itself to the person based on its three-dimensional coordinate and the three-dimensional coordinate of the person.

Figure 4:
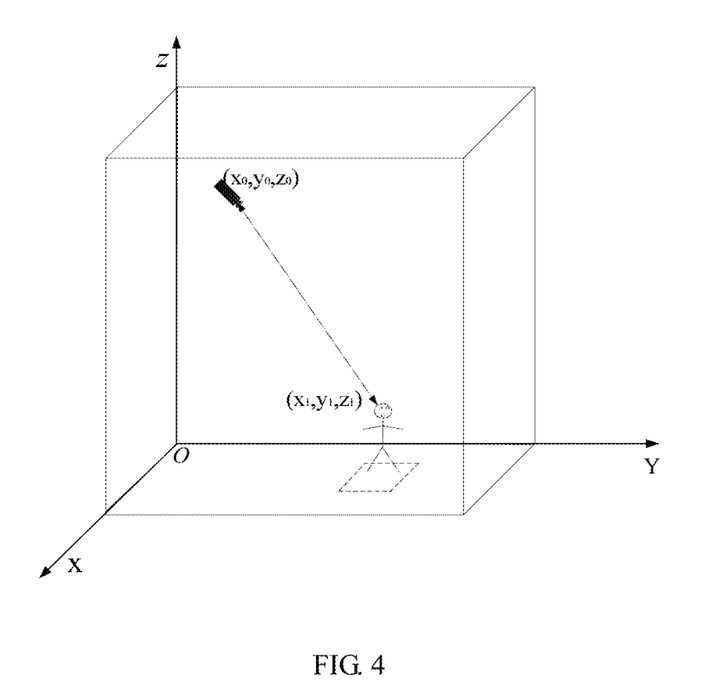
FIG. 4 is a schematic diagram of a three-dimensional coordinate system according to an embodiment of the present application.

For example, in a three-dimensional coordinate system shown in FIG. 4, when the three-dimensional coordinate of the video capture device is $(X_0, Y_0, Z_0)$ and the three-dimensional coordinate of the person is $(X_1, Y_1, Z_1)$, the target distance l from the video capture device to the head of the person may be determined as:

$$l = \sqrt{(X_0-X_1)^2+(Y_0-Y_1)^2+(Z_0-Z_2)^2}$$

At step S303, a target focal length corresponding to the target distance is identified based on a pre-stored correspondence between distances and focal lengths, and a focal length of the video capture device is adjusted to the target focal length.

In the embodiment of the present application, the video capture device may pre-store the correspondence between distances and focal lengths. For example, the correspondence between distances and focal lengths may be determined by the user based on empirical values, and is stored in the video capture device. For example, the correspondence between distances and focal lengths stored in the video capture device may be as shown in Table 3.

TABLE 3

| distance | focal length |
|---|---|
| 1 meter | a1 |
| 2 meters | a2 |
| 3 meters | a3 |
| 4 meters | a4 |

After the video capture device determines the target distance from itself to the person, the video capture device may identify the target focal length corresponding to the target distance based on the pre-stored correspondence between distances and focal lengths, and adjust its focal length to the target focal length.

For example, the video capture device may identify a distance the same as the target distance in the stored correspondence between distances and focal lengths, and determine a focal length corresponding to the distance as the target focal length corresponding to the target distance. The process of the video capture device adjusting the focal length may be any one of existing methods, which will not be described in detail herein.

In some cases, the target distance calculated by the video capture device may has decimals, and a distance the same as the target distance may not be identified in the stored correspondence between distances and focal lengths. In this case, the video capture device may identify a distance corresponding to the integer part of the target distance in the stored correspondence between distances and focal lengths and determine a focal length corresponding to the distance as the target focal length corresponding to the target distance.

In the embodiment of the present application, the video capture device may adjust its focal length based on the actual distance from itself to the person at the position of the sound source, and thus, the video recording effect can be improved.

Corresponding to the above method embodiment, an embodiment of the present application further provides an apparatus.

Figure 5:
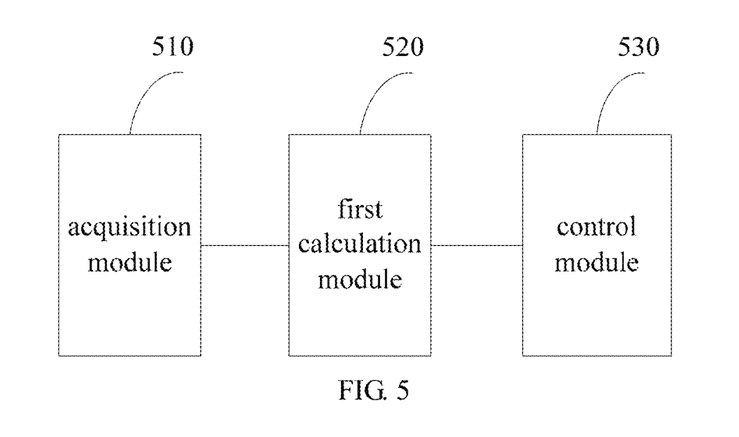
FIG. 5 is a schematic structural diagram of an apparatus for controlling a device according to the present application.

FIG. 5 shows an apparatus for controlling a device provided by the embodiment of the present application, which is applicable to a video capture device in a sound source localization system. The sound source localization system further includes microphones disposed outside the video capture device, and the apparatus includes:

an acquisition module 510, configured for acquiring a voice signal captured by each of the microphones, and acquiring coordinate information of each of the microphones and coordinate information of each of preset positions;

a first calculation module 520, configured for calculating a voice power value corresponding to each of the preset positions based on the voice signal captured by each of the microphones, the coordinate information of each of the microphones and the coordinate information of each of the preset positions;

a control module 530, configured for identifying a preset position with a maximum voice power value, determining the preset position as a position of a sound source, and controlling the video capture device to direct at the position of the sound source.

The embodiment of the present application provides an apparatus for controlling a device. The video capture device may acquire a voice signal captured by each of the microphones, acquire coordinate information of each of the microphones and coordinate information of each of preset positions, then, calculate a voice power value corresponding to each of the preset positions based on the voice signal captured by each of the microphones, the coordinate information of each of the microphones and the coordinate information of each of the preset positions, finally, identify a preset position with the maximum voice power value, determine the preset position as a position of the sound source, and control itself to direct at the position of the sound source. In the embodiment of the present application, microphones are disposed outside the video capture device, and the sound in the scene to be captured can all be captured by the microphones. Therefore, the accuracy of the sound source localization can be improved, thereby improving the accuracy of the device control.

As an implementation of the embodiment of the present application, the first calculation module 520 includes:

a first calculation submodule (not shown in the figures), configured for calculating a Fourier transform of each voice signal captured by each of the microphones;

a second calculation submodule (not shown in the figures), configured for, for each of the preset positions, calculating a difference of delay between the preset position and every two adjacent microphones based on the coordinate information of the preset position and the coordinate information of each of the microphones;

a third calculation submodule (not shown in the figures), configured for calculating, based on the Fourier transform of each voice signal and the difference of delay between the preset position and every two adjacent microphones, a generalized cross-correlation of the preset position with every two adjacent microphones;

a fourth calculation submodule (not shown in the figures), configured for calculating, based on the generalized cross-correlation of the preset position with every two adjacent microphones, the voice power value corresponding to the preset position.

As an implementation of the embodiment of the present application, the second calculation submodule is specifically configured for calculating a difference of delay $\tau_{mkl}$ between any preset position m and any two adjacent microphones k, l, according to the following formula:

$$\tau_{mkl} = \frac{|D_{mk} - D_{ml}|}{c}$$

wherein, $D_{mk}$ is a distance from the preset position m to the microphone k, $D_{ml}$ is the a distance from the preset position m to the microphone l, and c is the sound speed.

As an implementation of the embodiment of the present application, the third calculation submodule is specifically configured for calculating a generalized cross-correlation $R(\tau_{mkl})$ of any preset position m with any two adjacent microphones k, l according to the following formula:

$$R(\tau_{mkl}) = \int_{-\infty}^{+\infty} \phi_{kl}(w) M_k(w) M^*_l(w) e^{jw\tau} dw$$

wherein, $M_k(w)$ is a Fourier transform of a voice signal received by the microphone k; $M^*_l(w)$ is a conjugate of a Fourier transform of a voice signal received by the microphone l; w is a frequency of a voice signal; $\phi_{kl}(w)$ is determined by the following formula:

$$\phi_{kl}(w) = \frac{1}{|M_k(w) M^*_l(w)|}.$$

As an implementation of the embodiment of the present application, the fourth calculation submodule is specifically configured for calculating a voice power value P(m) corresponding to any preset position m according to the following formula:

$$P(m) = \sum_{k=1}^{M} \sum_{l=k+1}^{M} R(\tau_{mkl})$$

wherein, M is the total number of the microphones.

As an implementation of the embodiment of the present application, the apparatus further includes:

a determination module (not shown in the figures), configured for determining a height of a person at the position of the sound source;

a second calculation module (not shown in the figures), configured for calculating, based on the coordinate information of the video capture device, height of the video capture device, coordinate information of the position of the sound source and the height of the person at the position of the sound source, a target distance from the video capture device to the person;

an adjustment module (not shown in the figures), configured for identifying, based on a pre-stored correspondence between distances and focal lengths, a target focal length corresponding to the target distance, and adjusting a focal length of the video capture device to the target focal length.

As an implementation of the embodiment of the present application, the determining module is specifically configured for:

acquiring a pre-stored average height of people, and determining the acquired average height of people as the height of the person at the position of the sound source; or capturing an image including the person at the position of the sound source, and analyzing the image to obtain the height of the person at the position of the sound source.

Figure 6:
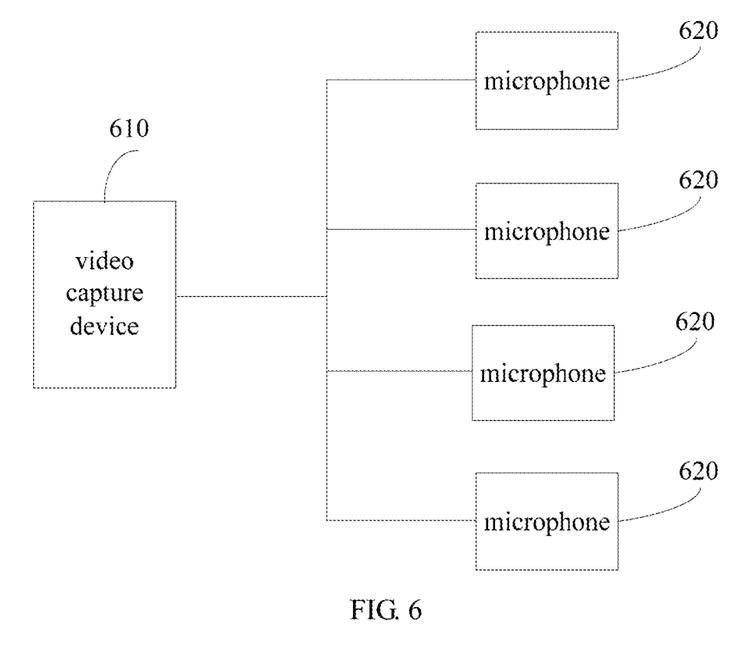
FIG. 6 is a schematic structural diagram of a system for controlling a device according to the present application.

As shown in FIG. 6, an embodiment of the present application further provides a system for controlling a device. The system includes: a video capture device 610 and microphones 620 disposed outside the video capture device 610.

The video capture device 610 is configured for acquiring a voice signal captured by each of the microphones 620, coordinate information of each of the microphones 620 and coordinate information of each of preset positions; calculating a voice power value corresponding to each of the preset positions based on the voice signal captured by each of the microphones 620, the coordinate information of each of the microphones and the coordinate information of each of the preset positions; identifying a preset position with a maximum voice power value, determining the preset position as a position of the sound source, and controlling the video capture device to direct at the position of the sound source.

Each of the microphones 620 is configured for capturing a voice signal, and sending the captured voice signal to the video capture device 610.

The embodiment of the present application provides a system for controlling a device. The video capture device may acquire a voice signal captured by each of the microphones, acquire coordinate information of each of the microphones and coordinate information of each of preset positions, then, calculate a voice power value corresponding to each of the preset positions based on the voice signal captured by each of the microphones, the coordinate information of each of the microphones and the coordinate information of each of the preset positions, finally, identify a preset position with the maximum voice power value, determine the preset position as a position of the sound source, and control itself to direct at the position of the sound source. In the embodiment of the present application, microphones are disposed outside the video capture device, and the sound in the scene to be captured can all be captured by the microphones. Therefore, the accuracy of the sound source localization can be improved, thereby improving the accuracy of the device control.

Figure 7:
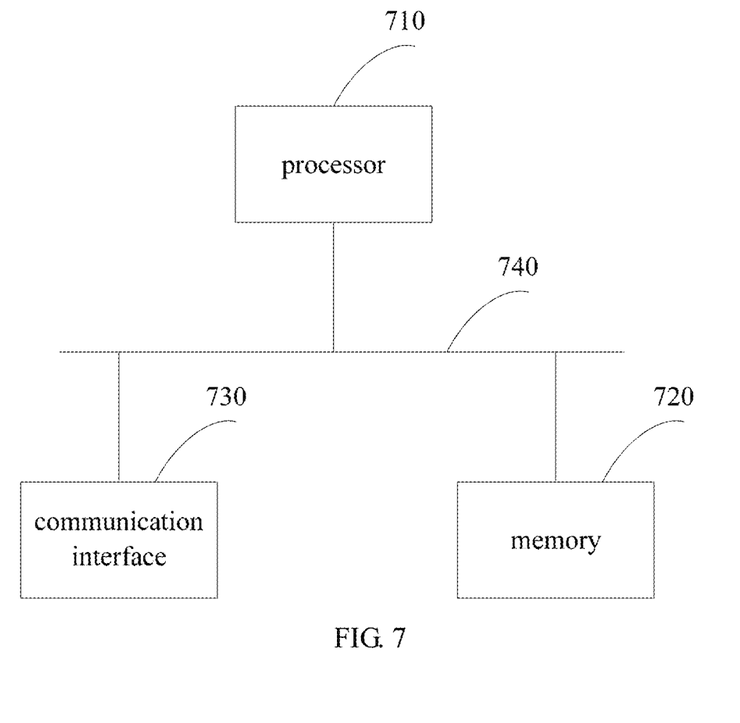
FIG. 7 is a schematic structural diagram of a video capture device according to the present application.

Correspondingly, as shown in FIG. 7, an embodiment of the present application further provides a video capture device, which may include:

a processor 710, a memory 720, a communication interface 730 and a bus 740.

The processor 710, the memory 720, and the communication interface 730 are connected and communicate with each other via the bus 740.

The memory 720 stores executable program code.

The processor 710 executes a program corresponding to the executable program code by reading the executable program code stored in the memory 720 to implement, when executing the program, the method for controlling a device according to the embodiment of the present application. The method includes:

acquiring a voice signal captured by each of the microphones, and acquiring coordinate information of each of the microphones and coordinate information of each of preset positions;

calculating a voice power value corresponding to each of the preset positions based on the voice signal captured by each of the microphones, the coordinate information of each of the microphones and the coordinate information of each of the preset positions;

identifying a preset position with a maximum voice power value, determining the preset position as a position of the sound source, and controlling the video capture device to direct at the position of the sound source.

In the embodiment of the present application, the video capture device may acquire a voice signal captured by each of the microphones, acquire coordinate information of each of the microphones and coordinate information of each of preset positions, then, calculate a voice power value corresponding to each of the preset positions based on the voice signal captured by each of the microphones, the coordinate information of each of the microphones and the coordinate information of each of the preset positions, finally, identify a preset position with the maximum voice power value, determine the preset position as a position of the sound source, and control itself to direct at the position of the sound source. In the embodiment of the present application, microphones are disposed outside the video capture device, and the sound in the scene to be captured can all be captured by the microphones. Therefore, the accuracy of the sound source localization can be improved, thereby improving the accuracy of the device control.

Correspondingly, an embodiment of the present application further provides a storage medium. The storage medium is configured for storing executable program code and the executable program code are configured for, when executed, implementing the method for controlling a device according to the embodiment of the present application. The method for controlling a device is applicable to a video capture device in a sound source localization system, the sound source localization system further includes microphones disposed outside the video capture device, and the method includes:

acquiring a voice signal captured by each of the microphones, and acquiring coordinate information of each of the microphones and coordinate information of each of preset positions;

calculating a voice power value corresponding to each of the preset positions based on the voice signal captured by each of the microphones, the coordinate information of each of the microphones and the coordinate information of each of the preset positions;

identifying a preset position with a maximum voice power value, determining the preset position as a position of the sound source, and controlling the video capture device to direct at the position of the sound source.

In the embodiment of the present application, the video capture device may acquire a voice signal captured by each of the microphones, acquire coordinate information of each of the microphones and coordinate information of each of preset positions, then, calculate a voice power value corresponding to each of the preset positions based on the voice signal captured by each of the microphones, the coordinate information of each of the microphones and the coordinate information of each of the preset positions, finally, identify a preset position with the maximum voice power value, determine the preset position as a position of the sound source, and control itself to direct at the position of the sound source. In the embodiment of the present application, microphones are disposed outside the video capture device, and the sound in the scene to be captured can all be captured by the microphones. Therefore, the accuracy of the sound source localization can be improved, thereby improving the accuracy of the device control.

Correspondingly, an embodiment of the present application further provides an application program. The application program is configured for, when executed, implementing the method for controlling a device according to the embodiment of the present application. The method for controlling a device is applicable to a video capture device in a sound source localization system, the sound source localization system further includes microphones disposed outside the video capture device, and the method includes:

acquiring a voice signal captured by each of the microphones, and acquiring coordinate information of each of the microphones and coordinate information of each of preset positions;

calculating a voice power value corresponding to each of the preset positions based on the voice signal captured by each of the microphones, the coordinate information of each of the microphones and the coordinate information of each of the preset positions;

identifying a preset position with a maximum voice power value, determining the preset position as a position of the sound source, and controlling the video capture device to direct at the position of the sound source.

In the embodiment of the present application, the video capture device may acquire a voice signal captured by each of the microphones, acquire coordinate information of each of the microphones and coordinate information of each of preset positions, then, calculate a voice power value corresponding to each of the preset positions based on the voice signal captured by each of the microphones, the coordinate information of each of the microphones and the coordinate information of each of the preset positions, finally, identify a preset position with the maximum voice power value, determine the preset position as a position of the sound source, and control itself to direct at the position of the sound source. In the embodiment of the present application, microphones are disposed outside the video capture device, and the sound in the scene to be captured can all be captured by the microphones. Therefore, the accuracy of the sound source localization can be improved, thereby improving the accuracy of the device control.

The embodiments of an apparatus/a system/a device/a storage medium/an application program are described briefly since they are substantially similar to the embodiment of the method. The related contents can refer to the description of the embodiment of the method.

It should be noted that the relationship terms used herein, such as "first", "second" and the like are only configured for distinguishing one entity or operation from another entity or operation, but do not necessarily require or imply that there is an actual relationship or order between these entities or operations. Moreover, the terms "include", "comprise", or any variants thereof are intended to cover a non-exclusive inclusion, such that processes, methods, articles, or devices, including a series of elements, include not only those elements that have been listed, but also other elements that are not specifically listed or the elements intrinsic to these processes, methods, articles, or devices. Without further limitations, elements defined by the wording "include(s) a/an . . . ", "comprise(s) a/an . . . " do not exclude additional identical elements in the processes, methods, articles, or devices including the listed elements.

All of the embodiments in the description are described in a correlated manner, and identical or similar parts in various embodiments can refer to one another. In addition, the description for each embodiment focuses on the differences from other embodiments. In particular, the embodiment of the apparatus is described briefly, since it is substantially similar to the embodiment of the method, and the related contents can refer to the description of the embodiment of the method.

It can be understood by those skills in the art that all or a part of steps in the implementations of the above method may be accomplished by instructing related hardware through programs, which may be stored in a computer-readable storage medium, such as in a ROM/RAM, a disk, an optical disk, and so on.

The embodiments described above are simply preferable embodiments of the present application, and are not intended to limit the scope of protection of the present application. Any modifications, alternatives, improvements, or the like within the spirit and principle of the present application shall be included within the scope of protection of the present application.

The invention claimed is:

1. A method for controlling a device, which is applicable to a video capture device in a sound source localization system; wherein, the sound source localization system further comprises microphones disposed outside the video capture device, and the method comprises:

acquiring a voice signal captured by each of the microphones, and acquiring coordinate information of each of the microphones and coordinate information of each of preset positions;

calculating a voice power value corresponding to each of the preset positions based on the voice signal captured by each of the microphones, the coordinate information of each of the microphones and the coordinate information of each of the preset positions;

identifying a preset position with a maximum voice power value, determining the preset position as a position of a sound source, and controlling the video capture device to direct at the position of the sound source;

wherein, calculating a voice power value corresponding to each of the preset positions based on the voice signal captured by each of the microphones, the coordinate information of each of the microphones and the coordinate information of each of the preset positions, comprises:

calculating a Fourier transform of each voice signal captured by each of the microphones;

for each of the preset positions:

calculating a difference of delay between the preset position and every two adjacent microphones based on the coordinate information of the preset position and the coordinate information of each of the microphones;

calculating, based on the Fourier transform of each voice signal and the difference of delay between the preset position and every two adjacent microphones, a generalized cross-correlation of the preset position with every two adjacent microphones; and calculating, based on the generalized cross-correlation of the preset position with every two adjacent microphones, the voice power value corresponding to the preset position.

2. The method of claim 1, wherein, for each of the preset positions, calculating a difference of delay between the preset position and every two adjacent microphones based on the coordinate information of the preset position and the coordinate information of each of the microphones, comprises:

calculating a difference of delay $\tau_{mkl}$ between any preset position m and any two adjacent microphones k, l according to the following formula:

$$\tau_{mkl} = \frac{|D_{mk} - D_{ml}|}{c}$$

wherein, $D_{mk}$ is a distance from the preset position m to the microphone k, $D_{ml}$ is the a distance from the preset position m to the microphone l, and c is the sound speed.

3. The method of claim 2, wherein, calculating, based on the Fourier transform of each voice signal and the difference of delay between the preset position and every two adjacent microphones, a generalized cross-correlation of the preset position with every two adjacent microphones, comprises:

calculating a generalized cross-correlation $R(\tau_{mkl})$ of any preset position m with any two adjacent microphones k, l, according to the following formula:

$$R(\tau_{mkl}) = \int_{-\infty}^{+\infty} \phi_{kl}(w) M_k(w) M^*_l(w) e^{jw\tau} dw$$

wherein, $M_k(w)$ is a Fourier transform of a voice signal received by the microphone k; $M^*_l(w)$ is a conjugate of a Fourier transform of a voice signal received by the microphone l; w is a frequency of a voice signal; $\phi_{kl}(w)$ is determined by the following formula:

$$\phi_{kl}(w) = \frac{1}{|M_k(w) M^*_l(w)|}.$$

4. The method of claim 3, wherein, calculating, based on the generalized cross-correlation of the preset position with every two adjacent microphones, the voice power value corresponding to the preset position, comprises:

calculating a voice power value P(m) corresponding to any preset position m according to a following formula:

$$P(m) = \sum_{k=1}^{M} \sum_{l=k+1}^{M} R(\tau_{mkl})$$

wherein, M is a total number of the microphones.

5. The method of claim 1, wherein, the method further comprises:
   determining a height of a person at the position of the sound source;
   calculating, based on coordinate information of the video capture device, a height of the video capture device, coordinate information of the position of the sound source and the height of the person at the position of the sound source, a target distance from the video capture device to the person;
   identifying, based on a pre-stored correspondence between distances and focal lengths, a target focal length corresponding to the target distance, and adjusting a focal length of the video capture device to the target focal length.

6. The method of claim 5, wherein, determining a height of a person at the position of the sound source, comprises:
   acquiring a pre-stored average height of people, and determining the acquired average height of people as the height of the person at the position of the sound source; or
   capturing an image comprising the person at the position of the sound source, and analyzing the image to obtain the height of the person at the position of the sound source.

7. An apparatus for controlling a device, which is applicable to a video capture device in a sound source localization system; wherein, the sound source localization system further comprises microphones disposed outside the video capture device, and the apparatus comprises:
   an acquisition module, configured for acquiring a voice signal captured by each of the microphones, and acquiring coordinate information of each of the microphones and coordinate information of each of preset positions;
   a first calculation module, configured for calculating a voice power value corresponding to each of the preset positions based on the voice signal captured by each of the microphones, the coordinate information of each of the microphones and the coordinate information of each of the preset positions;
   a control module, configured for identifying a preset position with a maximum voice power value, determining the preset position as a position of a sound source, and controlling the video capture device to direct at the position of the sound source;
   wherein, the calculation module comprises:
   a first calculation submodule, configured for calculating a Fourier transform of each voice signal captured by each of the microphones;
   a second calculation submodule, configured for, for each of the preset positions, calculating a difference of delay between the preset position and every two adjacent microphones based on the coordinate information of the preset position and the coordinate information of each of the microphones;
   a third calculation submodule, configured for, for each of the preset positions, calculating a generalized cross-correlation of the preset position with every two adjacent microphones based on the Fourier transform of each voice signal and the difference of delay between the preset position and every two adjacent microphones; and
   a fourth calculation submodule, configured for, for each of the preset positions, calculating the voice power value corresponding to the preset position based on the generalized cross-correlation of the preset position with every two adjacent microphones.

8. The apparatus of claim 7, wherein, the second calculation submodule is specifically configured for calculating a difference of delay $\tau_{mkl}$ between any preset position m and any two adjacent microphones k, l according to a following formula:

$$\tau_{mkl} = \frac{|D_{mk} - D_{ml}|}{c}$$

wherein, $D_{mk}$ is a distance from the preset position m to the microphone k, $D_{ml}$ is the a distance from the preset position m to the microphone l, and c is the sound speed.

9. The apparatus of claim 8, wherein, the third calculation submodule is specifically configured for calculating a generalized cross-correlation $R(\tau_{mkl})$ of any preset position m with any two adjacent microphones k, l, according to the following formula:

$$R(\tau_{mkl}) = \int_{-\infty}^{+\infty} \phi_{kl}(w) M_k(w) M^*_l(w) e^{jw\tau} dw$$

wherein, $M_k(w)$ is a Fourier transform of a voice signal received by the microphone k; $M^*_l(w)$ is a conjugate of a Fourier transform of a voice signal received by the microphone l; w is a frequency of a voice signal; $\phi_{kl}(w)$ is determined by the following formula:

$$\phi_{kl}(w) = \frac{1}{|M_k(w) M^*_l(w)|}.$$

10. The apparatus of claim 9, wherein, the fourth calculation submodule is specifically configured for calculating a voice power value P(m) corresponding to any preset position m according to a following formula:

$$P(m) = \sum_{k=1}^{M} \sum_{l=k+1}^{M} R(\tau_{mkl})$$

wherein, M is a total number of the microphones.

11. The apparatus of claim 7, wherein, the apparatus further comprises:
   a determination module, configured for determining a height of a person at the position of the sound source;
   a second calculation module, configured for calculating, based on coordinate information of the video capture device, a height of the video capture device, coordinate information of the position of the sound source and the height of the person at the position of the sound source, a target distance from the video capture device to the person;
   an adjustment module, configured for identifying, based on a pre-stored correspondence between distances and focal lengths, a target focal length corresponding to the target distance, and adjusting a focal length of the video capture device to the target focal length.

12. The apparatus of claim 11, wherein, the determination module is specifically configured for:
   acquiring a pre-stored average height of people, and determining the acquired average height of people as the height of the person at the position of the sound source; or
   capturing an image comprising the person at the position of the sound source, and analyzing the image to obtain the height of the person at the position of the sound source.

13. A system for controlling a device, comprising a video capture device and microphones disposed outside the video capture device; wherein,
   the video capture device is configured for acquiring a voice signal captured by each of the microphones, and acquiring coordinate information of each of the microphones and coordinate information of each of preset positions, calculating a voice power value corresponding to each of the preset positions based on the voice signal captured by each of the microphones, the coordinate information of each of the microphones and the coordinate information of each of the preset positions, identifying a preset position with a maximum voice power value, determining the preset position as a position of a sound source, and controlling the video capture device to direct at the position of the sound source;
   each of the microphones is configured for capturing a voice signal, and sending the captured voice signal to the video capture device;
   wherein, calculating a voice power value corresponding to each of the preset positions based on the voice signal captured by each of the microphones, the coordinate information of each of the microphones and the coordinate information of each of the preset positions, comprises:
   calculating a Fourier transform of each voice signal captured by each of the microphones;
   for each of the preset positions:
   calculating a difference of delay between the preset position and every two adjacent microphones based on the coordinate information of the preset position and the coordinate information of each of the microphones;
   calculating, based on the Fourier transform of each voice signal and the difference of delay between the preset position and every two adjacent microphones, a generalized cross-correlation of the preset position with every two adjacent microphones; and
   calculating, based on the generalized cross-correlation of the preset position with every two adjacent microphones, the voice power value corresponding to the preset position.

14. A video capture device, comprising:
   a processor, a memory, a communication interface and a bus; wherein,
   the processor, the memory, and the communication interface are connected and communicate with each other via the bus;
   the memory stores executable program code;
   the processor executes a program corresponding to the executable program code by reading the executable program code stored in the memory, to implement the method for controlling a device of claim 1.

15. A non-transitory storage medium, configured for storing executable program code; wherein, the executable program code is configured for, when executed, implementing the method for controlling a device of claim 1.

* * * * *